(12) United States Patent
Courbon et al.

(10) Patent No.: US 7,303,293 B2
(45) Date of Patent: Dec. 4, 2007

(54) MIRROR STABILIZER ARM CONNECTOR ASSEMBLY

(75) Inventors: Emmanuel Courbon, Columbia, SC (US); Andreas Enz, Columbia, SC (US)

(73) Assignee: Lang Mekra North America, LLC, Ridgeway, SC (US)

( * ) Notice: Subject to any disclaimer, the term of this patent is extended or adjusted under 35 U.S.C. 154(b) by 209 days.

(21) Appl. No.: 11/122,462

(22) Filed: May 4, 2005

(65) Prior Publication Data

US 2006/0262450 A1 Nov. 23, 2006

(51) Int. Cl.
*G02B 5/08* (2006.01)
*G02B 7/18* (2006.01)

(52) U.S. Cl. ............... 359/841; 359/872; 359/881; 248/478

(58) Field of Classification Search ........ 359/841, 359/871, 872, 875, 881; 248/476, 477, 479, 248/480, 478

See application file for complete search history.

(56) References Cited

U.S. PATENT DOCUMENTS

| | | | |
|---|---|---|---|
| 2,458,117 A | 1/1949 | Tolbert | |
| 2,545,777 A | 3/1951 | Hardin | |
| 2,552,074 A | 5/1951 | Thompson | |
| 3,168,277 A | 2/1965 | Stewart | |
| 3,259,349 A | 7/1966 | Lee | |
| 3,371,903 A | 3/1968 | Thompson | |
| 3,501,122 A | 3/1970 | Barker | |
| 3,637,186 A | 1/1972 | Greenfield | |
| 3,831,896 A | 8/1974 | Owens | |
| 3,857,539 A | 12/1974 | Kavanaugh | |
| 5,880,895 A | 3/1999 | Lang et al. | |
| D462,305 S | 9/2002 | Abalos et al. | |
| 6,578,973 B2 | 6/2003 | Apfelbeck | |
| 6,598,983 B1 | 7/2003 | Boddy | |
| 6,962,420 B2 * | 11/2005 | Branham | 359/841 |
| 2003/0116690 A1 | 6/2003 | Frazier et al. | |

* cited by examiner

*Primary Examiner*—Alessandro Amari
(74) *Attorney, Agent, or Firm*—McNair Law Firm, P.A.; Cort Flint

(57) ABSTRACT

A vehicle mirror assembly for mounting an exterior rearview mirror to a vehicle body, the assembly having a support arm pivotally mounted to the vehicle for supporting the mirror, and a stabilizer bar having a first end pivotally mounted to the vehicle and a second end attached to the support arm, the assembly comprising: a connector head carried by one of the second end of the stabilizer bar and the support arm, and a connector receiver carried by the other stabilizer bar and support arm. The connector receiver includes a retention slot for receiving the connector head. A first locking element is carried by the connector head, a second locking element is carried within the retention slot; and an elongated convex biasing spring carried in the retention slot biasing the first and second locking elements together to provide a reliable interlocking connection between the stabilizer bar and support arm.

21 Claims, 6 Drawing Sheets

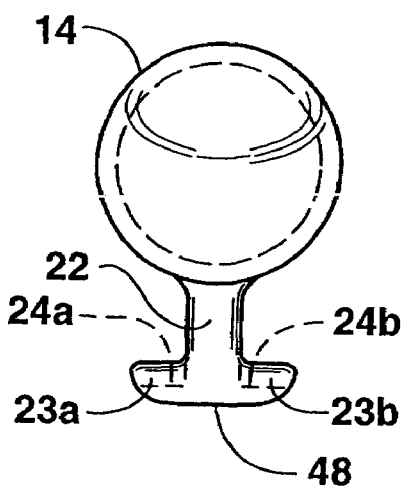
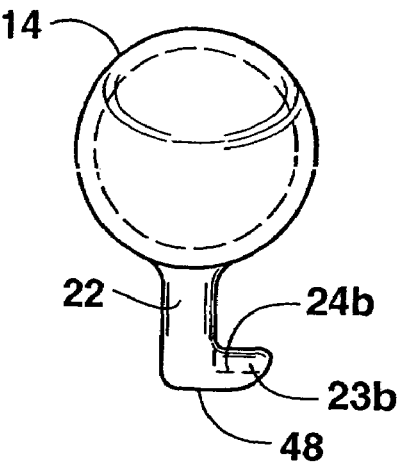
FIG. 6A  FIG. 6B
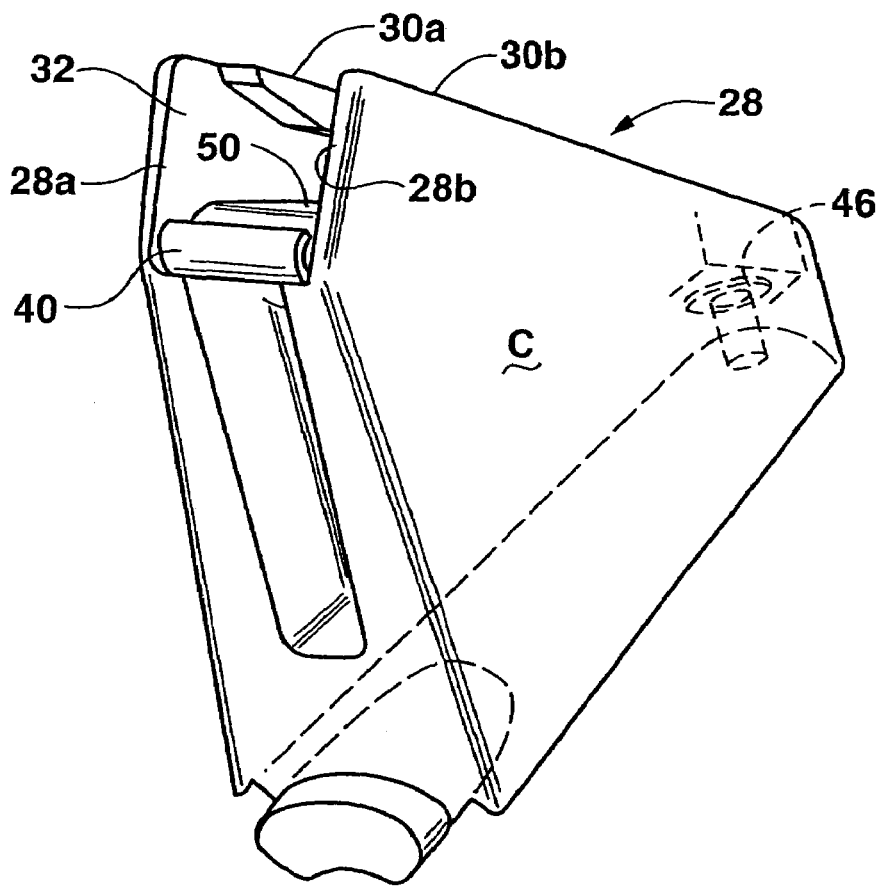
FIG. 7

MIRROR STABILIZER ARM CONNECTOR ASSEMBLY

BACKGROUND OF THE INVENTION

The invention relates to vehicle mirrors, and particularly to exterior mirrors for large truck and other similar vehicles. Typically, mirror support assemblies include a C-shape support arm which attaches to the vehicle at its free ends. In addition, the stabilizer arm is often used that extends from the vehicle to the support arm to support the mirror head in a more stable manner. Previously, stabilizer arms provided have a connection between the stabilizer arm and the support arm which can be disconnected. This allows the mirror to be folded for washing and other purposes, and also prevents the mirror from breaking if it should strike an object. Previous connectors for stabilizer arms have used a rubber insert to place a friction in the connector joint so the stabilizer arm is held in place. However, the rubber wears and loses its friction fit. Since the rubber is not very compressible, the rubber tip that provides the friction can only be compressed a certain amount. When that rubber insert wears on the friction surface, it loses its fit.

In accordance with the present invention a release spring is preloaded in the connector housing and the insert is made from a polymer material for reduced wear. Reduced wear on the friction fit due to wear will be negligible in this case. The release spring is exert a fairly constant load on the insert and there will be little wear of the insert since it is a polymer material.

The prior art stabilizer arm connector assembly also has problems in that three parts are utilized that must be fitted together. The rubber insert must be fitted inside the guide block that the rubber insert is fitted into, and then those two parts must be fitted into a corresponding slot or opening in the connector joint. To fit the rubber insert properly into the guide block, and then fit the parts into the connector housing, are sometimes difficult. It the parts are not fitted correctly then the stabilizer arm does not function properly.

According to the present invention only two parts are required to be provided. A receiver connector having a narrow slot and a biasing element received in the slot which is low in cost, and applies a fairly consistent load.

SUMMARY OF THE INVENTION

The above objectives are accomplished according to the present invention in a vehicle mirror assembly for mounting an exterior rearview mirror to a vehicle body. The assembly is of the type having a support arm which can be pivotally mounted to the vehicle for supporting the mirror, and a stabilizer bar having a first end pivotally mounted to the vehicle and a second end attached to the support arm. A connector head is carried by one of the second end of the stabilizer bar and the support arm, and a connector receiver is carried by the other of the stabilizer bar and support arm. An indent and a nib are carried by respective ones of the connector head and connector receiver which engage to provide an interlocking engagement. The connector head includes a narrow web and a lateral head flange extending from the narrow web. A retention slot is formed in the connection receiver including a top opening in which the web of the connector head slides. The retention slot includes a lateral slot flange projecting into the top opening overlying the connector head flange when the connector head is received in the retention slot. An indent and a nib are carried by respective ones of the slot and head flange to interlock upon completing the insertion of the connector head into the slot. A convex biasing element is carried in the retention slot biasing the first and second locking elements, in the form of the indent and neb, together. In this manner a reliable interlocking connection is provided between the stabilizer bar and support arm.

Preferably, the connection head includes lateral head flanges extending on opposing sides of the narrow web, and the connector receiver includes lateral slot flanges carried by opposing edges of the retention slot projecting into said top opening and extending over the head flanges. The indent is carried by each of the slot flanges and head flanges, and the nib is carried by each of the other slot flanges and head flanges so that pairs of nibs and indents interlock. Advantageously, the biasing element comprises an elongated leaf spring having first and second ends and a convex midsection. The leaf spring is carried longitudinally in the retention slot so that the connector head engages and depresses the convex section when the connector head is engaged in the connector receiver. One end of the leaf spring is free to move relative to the longitudinal slot to facilitate compression of the leaf spring. An opposing end of the spring is fixed in the receiver head.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 6A is an end elevation of the stabilizer arm and connector head according to the invention;

FIG. 6B is an alternate embodiment of the present invention;

FIG. 7 is a perspective view of a connector receiver according to the invention.

DESCRIPTION OF A PREFERRED EMBODIMENT

Referring now in more detail to the drawings, the invention will now be described in more detail.

Figure 1A:
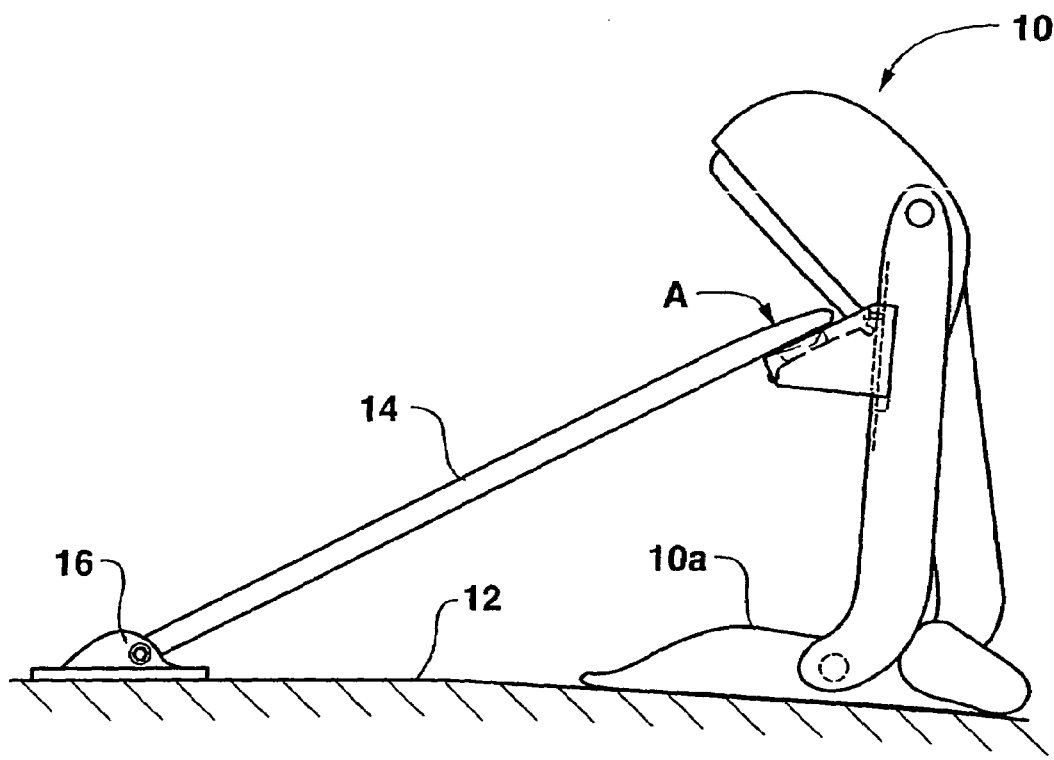
FIG. 1A is a top plan view illustrating a vehicle mirror assembly with a stabilizer arm connector constructed according to the present invention.
Figure 1B:
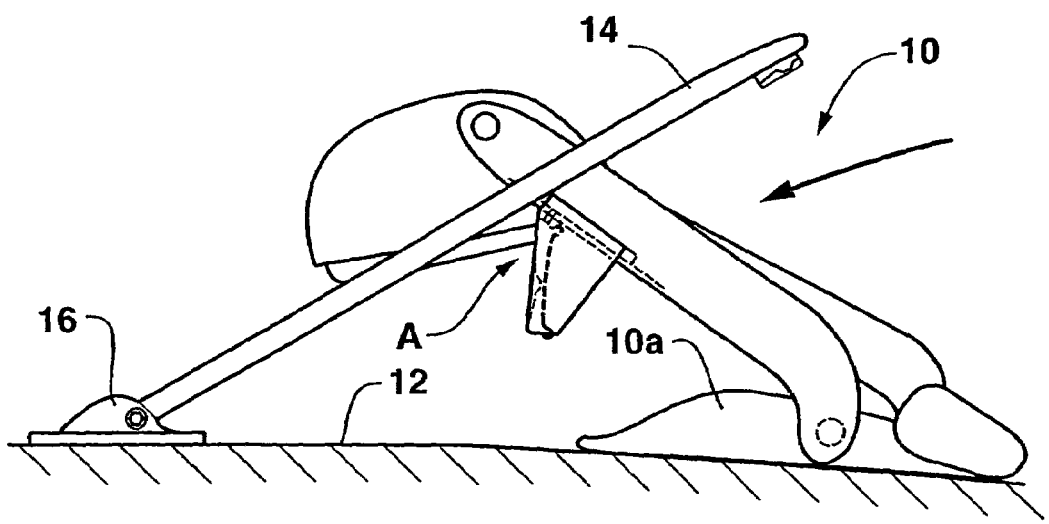
FIG. 1B is a top plan view showing the stabilizer arm disconnected from the mirror assembly.
Figure 2A:
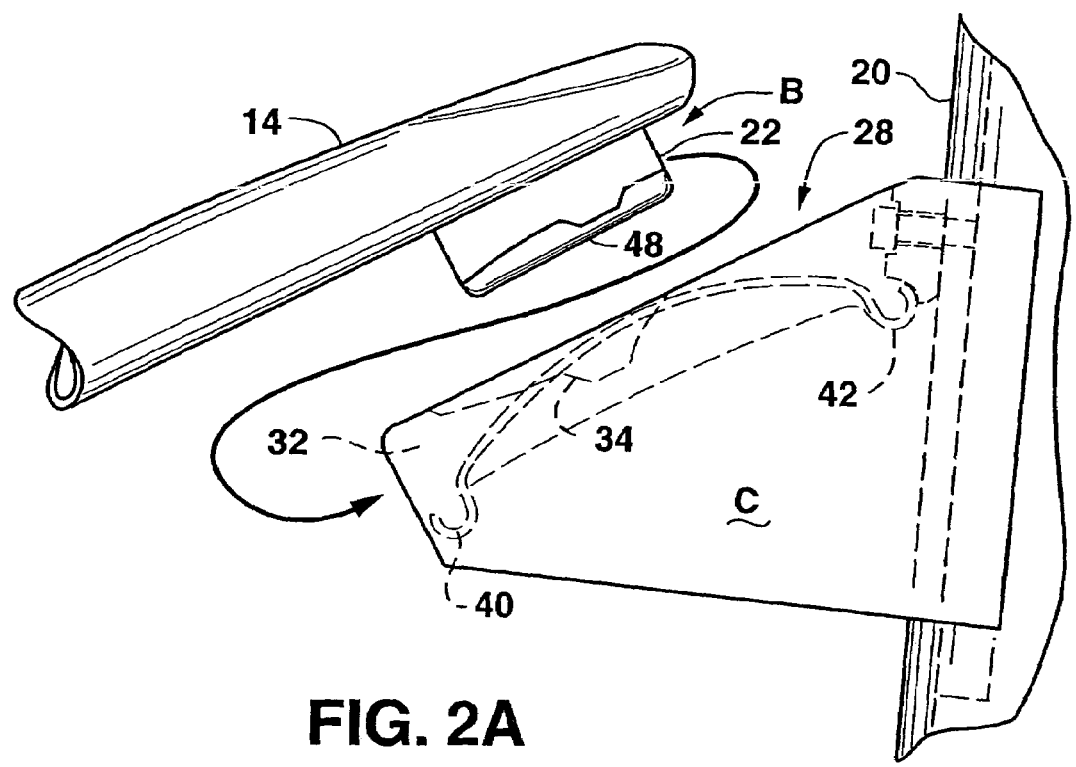
FIG. 2A is a enlarged plan view illustrating a stabilizer arm having a connector head being inserted into a connector receiver having a retention slot according to the invention.
Figure 2B:
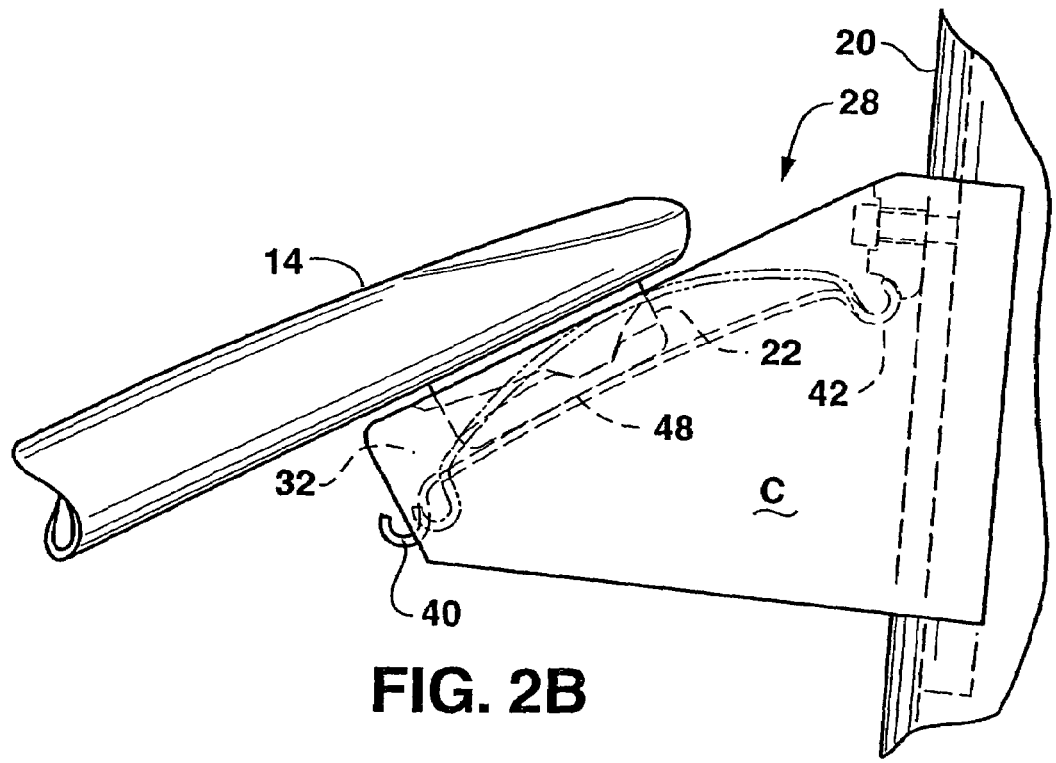
FIG. 2B is a plan view with the connector head engaged in a retention slot.

As can best be seen in FIGS. 1A and 1B, a mirror assembly, designated generally as 10, is illustrated affixed to a body of a vehicle 12. A stabilizer arm 14 is pivotally connected to the vehicle by means of a pivot mount 16. The mirror assembly 10 is connected to the vehicle by suitable fasteners which secure a base 10a to the vehicle 12. Connecting the stabilizer arm to the mirror assembly is a connector assembly, designated generally as A. With the stabilizer arm 14 removed from the connector assembly the mirror assembly may be folded (FIG. 1B). Referring now in more detail to connector assembly A, the connector assembly includes a connector head B and a connector receiver C. While the connector head and receiver may be interchanged on stabilizer arm 14 and a support arm of the mirror assembly, it is preferred that the connector head B be carried by stabilizer arm 14 in that connector receiver C be carried by mirror support arm 20. Connector head B includes a web 22 having at least one lateral flange projecting transversely to the web (FIG. 6B) Preferably there is a pair of lateral flanges 23a and 23b on either side of web 22 (FIG. 6A). Each lateral flange includes a first retention element 24 preferably in the form of a detent. Lateral projection 23a includes a detent or notch 24a and lateral projection 23b includes a notch or detent 24b. Connector receiver C includes a retention slot 28 in which connector head B is received and locked therein. For this purpose, a pair of inwardly extending slot flange 30 projects into an open top 28a of the slot. Preferably there are a pair of slot flanges 30a and 30b projecting inwardly into open top 28a to define a narrow passageway 32 between which web 22 of connector head B slides. A second retention element 34 is carried by slot flanges 30a and 30b for interlocking with detents 24a and 24b of the connector head. For this purpose, the nibs and detents correspond in shape. It is to be understood, of course, that a plurality of notches and a plurality of nibs may be utilized to interlock the connector head and connector receiver together instead of a single detent and nib on each flange.

Figure 3:
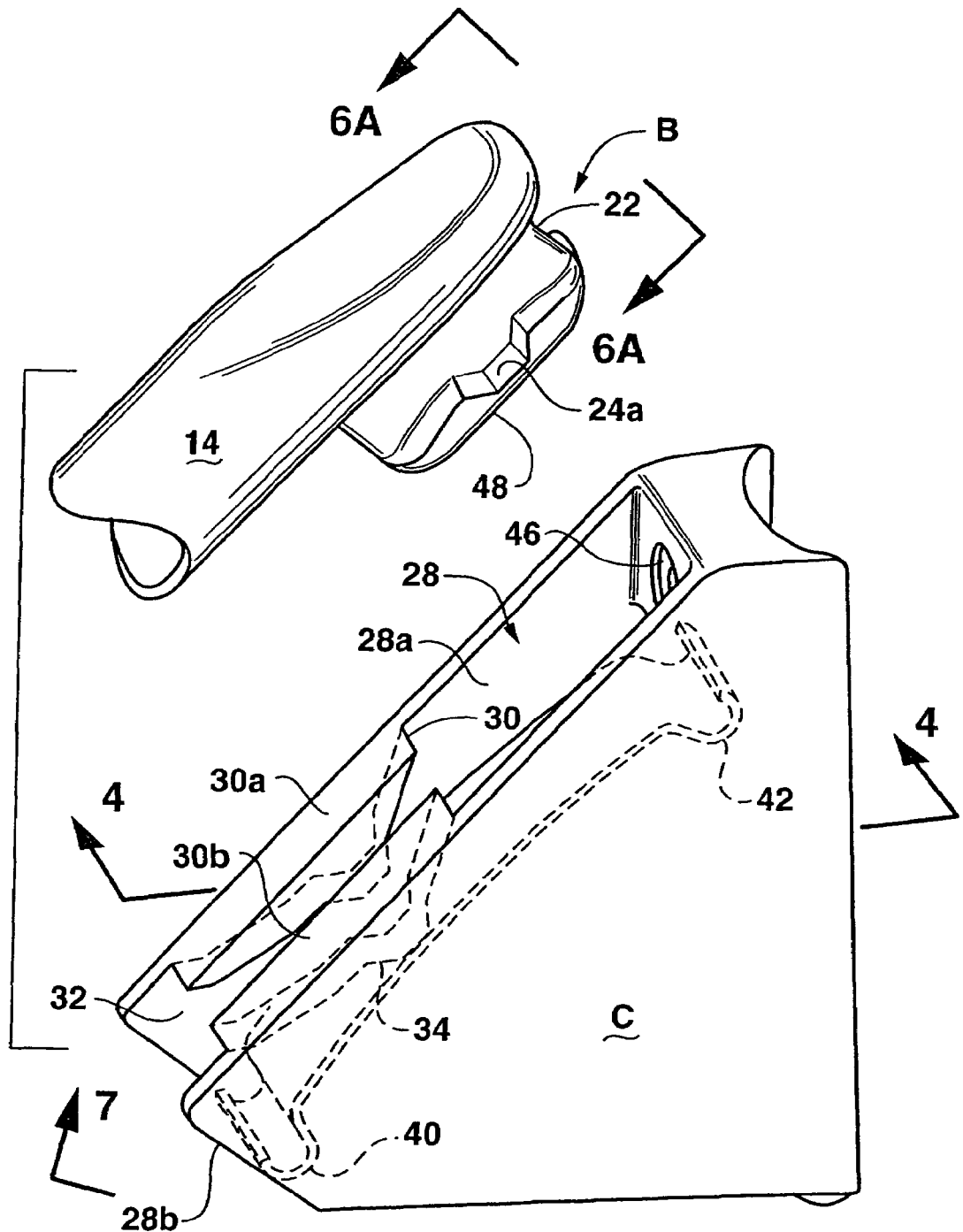
FIG. 3 is a perspective view illustrating a connector assembly for a stabilizer arm and mirror assembly according to the invention.
Figure 4:
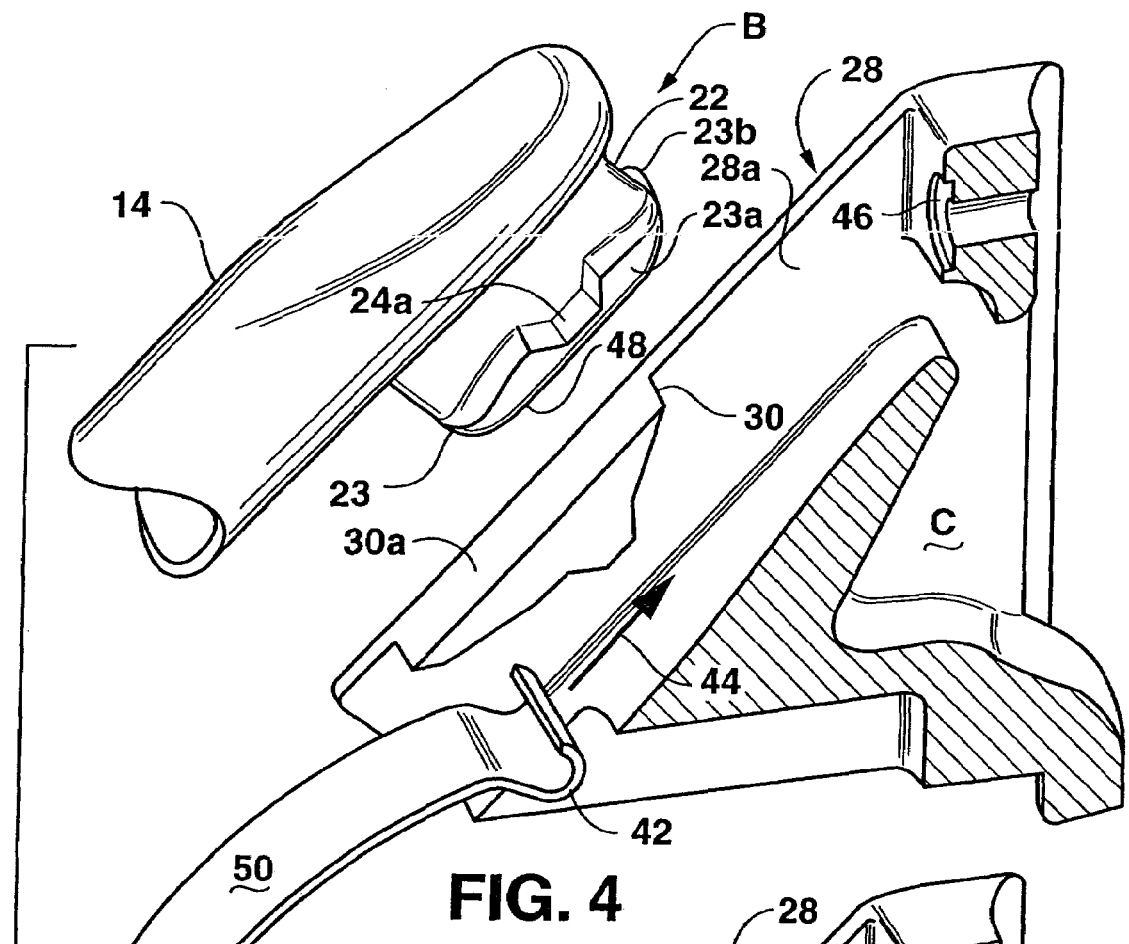
FIG. 4 is a sectional view taken along line 4-4 of FIG. 3.
Figure 5:
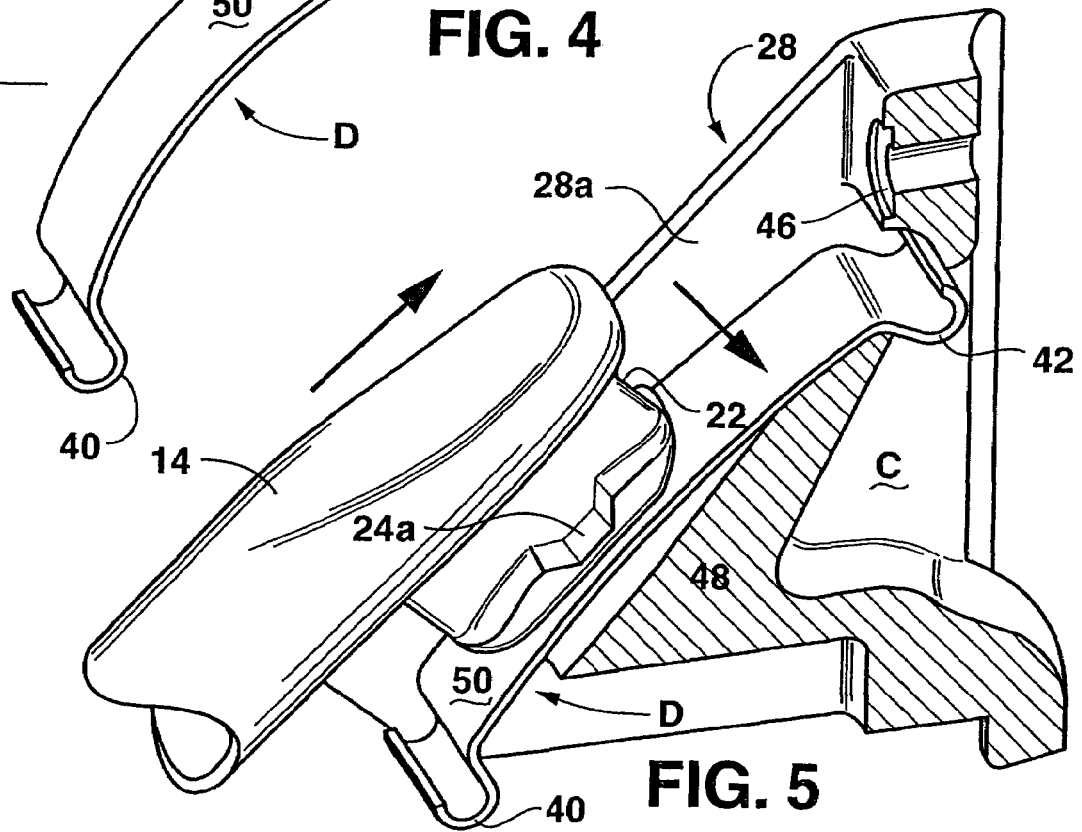
FIG. 5 is a sectional view of FIG. 4 showing the connector head received in a retention slot.

As can best be seen in FIGS. 3 through 5, an elongated biasing element D is carried within retention slot 20a of connector receiver C. Biasing element D is advantageously in the form of a release spring having a first end 40 and a second end 42. Preferably end 42 is fixed with respect to the retention slot by affixation in a channel lock 42a (FIG. 8), and end 40 is free to move longitudinally in the retention slot in the direction opposite to the direction that connector head B is inserted into the slot. The allows the release spring to be compressed as end 40 moves slightly to allow the compression. Suitable means such as hole/fastener 46, 46a on end and a hook 47 on the other end, may be provided for fastening connector receiver 28 to support arm 20 of the mirror assembly.

Figure 8:
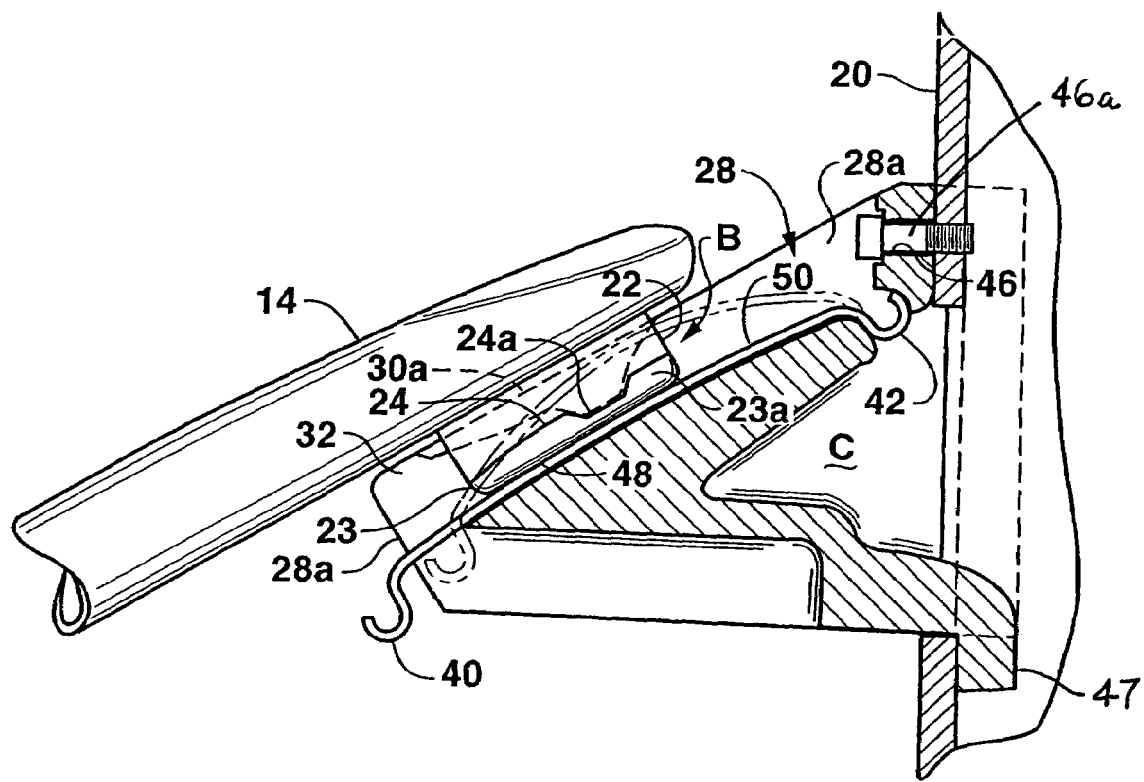
FIG. 8 is a sectional view illustrating the biasing element in natural and compressed positions.

In operation, to secure stabilizer arm 14 to the mirror assembly, connector head B enters an insertion end 28b of retention slot 28. A smooth bottom surface 48 of connector head B engages a flat convex surface 50 of biasing element D to press the convex portion downwardly as lateral head flanges 23a and 23b slide underneath slot flanges 30a and 30b until nibs 34a and 34b interlock in detents 24a and 24b. With the interlocking of the nibs and detents, release spring 38 is substantially compressed due to the longitudinal movement of spring end 40 (FIG. 8). A substantial upward force is applied against connector head tightly pressing the nibs into the detent notches of the connector head.

While a preferred embodiment of the invention has been described using specific terms, such description is for illustrative purposes only, and it is to be understood that changes and variations may be made without departing from the spirit or scope of the following claims.

What is claimed is:

1. A vehicle mirror assembly for mounting an exterior rearview mirror to a vehicle body, the assembly having a support arm which is pivotally mounted to the vehicle for supporting the mirror, and a stabilizer bar having a first end pivotally mounted to the vehicle and a second end attached to the support arm, said assembly comprising:

a connector head carried by one of said second end of said stabilizer bar and said support arm, and a connector receiver carried by the other of said stabilizer bar and support arm;

said connector receiver including a retention slot for receiving said connector head;

a first locking element carried by said connector head;

a second locking element carried within said retention slot; and an elongated convex biasing element carried longitudinally in said retention slot biasing said first and second locking elements together to provide a reliable interlocking connection between said stabilizer bar and support arm; and said retention slot extends longitudinally in said connector receiver, and said biasing element is carried between a bottom surface of said slot and said connector head biasing said connector head upwards to urge said first and second locking elements together.

2. The assembly of claim 1 wherein said first locking element includes an indent carried by one of said connector head and said connector receiver; and said second locking element comprises a nib carried by the other of said connector head and connector receiver projecting into said indent in interlocking engagement.

3. The assembly of claim 2 wherein said connector head includes a narrow web and a lateral head flange extending from said web, said retention slot including a top opening in which said web of said connector head slides to interlock said first and second locking elements, said retention slot includes a lateral slot flange projecting into said top opening overlying said connector head flange when said connector head is received in said retention slot.

4. The assembly of claim 3 wherein one of said indent is carried by one of said slot flange and head flange and said nib is carried by the other of said slot flange and head flange.

5. The assembly of claim 3 wherein said connection head includes lateral head flanges carried on opposing sides of said narrow web, and said connector receiver includes lateral slot flanges carried by opposing edges of said retention slot projecting into said top opening and extending over said head flanges.

6. The assembly of claim 5 wherein one of said indent is carried by one of said slot flanges and head flanges, and said nib is carried by the other of said slot flanges and head flanges.

7. The assembly of claim 6 including said indent is carried by each of said one of said slot flanges and head flanges, and said nib is carried by each of the other of said slot flanges and head flanges.

8. The apparatus and assembly of claim 2 wherein said biasing element includes an elongated spring having a convex section, and said connector head engages said spring and depresses said spring downwardly as said connector head slides in said retention slot so that said retention nib and retention notch are urged together in an interlocking relationship.

9. The assembly of claim 1 where a first end of said biasing element is fixed in said receiver head, and a second end of said biasing element is free to move longitudinally relative to said slot.

10. The assembly of claim 1 wherein said biasing element comprises an elongated leaf spring having first and second ends, said leaf spring having a convex section between said first and second ends, said leaf spring being carried longitudinally in said retention slot so that said connector head engages and depresses said convex section when said connector head is engaged in said connector receiver.

11. The assembly of claim 10 including a mounting element for affixing said first end of said biasing element in said connector receiver for retaining said leaf spring in said retention slot wherein said second end of said biasing element is free to move generally longitudinally when said convex section is compressed.

12. A vehicle mirror assembly for mounting an exterior rearview mirror to a vehicle body, the assembly having a support arm which is pivotally mounted to the vehicle for supporting the mirror, a stabilizer bar having a first end pivotally mounted to the vehicle and a second end attached to the support arm a connector head carried by one of said second end of said stabilizer bar and said support arm, and a connector receiver carried by the other of said stabilizer bar and support arm, wherein said assembly comprises:
   an indent carried by one of said connector head and said connector receiver; and a nib carried by the other of said connector head and connector receiver projecting into said indent in interlocking engagement;
   a connector head including a narrow web and a lateral head flange extending from said narrow web;
   a connector receiver for receiving said connector head;
   a retention slot formed in said connection receiver including a top opening in which said web of said connector head slides, said retention slot including a lateral slot flange projecting into said top opening overlying said connector head flange when said connector head is received in said retention slot;
   an indent carried by one of said slot flange and head flange, and a nib carried by the other of said slot flange and head flange;
   a biasing element carried in said retention slot biasing said first and second locking elements together to provide a reliable interlocking connection between said stabilizer bar and support arm.

13. The assembly of claim 12 wherein said connection head includes lateral head flanges extending on opposing sides of said narrow web, and said connector receiver includes lateral slot flanges carried by opposing edges of said retention slot projecting into said top opening and extending over said head flanges.

14. The assembly of claim 13 including said indent is carried by each of said one of said slot flanges and head flanges, and said nib is carried by each of the other of said slot flanges and head flanges.

15. The assembly of claim 12 wherein said biasing element comprises a convex elongated leaf spring having first and second ends, said leaf spring having a convex section between said first and second ends, said leaf spring being carried longitudinally in said retention slot so that said connector head engages and depresses said convex section when said connector head is engaged in said connector receiver.

16. The assembly of claim 15 wherein said biasing element includes an elongated convex spring element, and first and second mounting elements included in said connector receiver for retaining said spring in said retention slot.

17. The assembly of claim 16 wherein one end of said spring is free to move relative to said longitudinal slot to facilitate compression of said spring.

18. The assembly of claim 12 wherein one end of said convex biasing element is free to move relative to said longitudinal slot to facilitate compression of said bearing element.

19. The assembly of claim 18 wherein an opposing end of said bearing element is fixed in said receiver head.

20. A vehicle mirror assembly for mounting an exterior rearview mirror to a vehicle body, the assembly having a support arm which is pivotally mounted to the vehicle for supporting the mirror, and a stabilizer bar having a first end pivotally mounted to the vehicle and a second end attached to the support arm, said assembly comprising:
   a connector head carried by one of said second end of said stabilizer bar and said support arm, and a connector receiver carried by the other of said stabilizer bar and support arm;
   said connector receiver including a retention slot for receiving said connector head;
   a first locking element carried by said connector head;
   a second locking element carried within said retention slot; and
   an elongated convex biasing element carried longitudinally in said retention slot biasing said first and second locking elements together to provide a reliable interlocking connection between said stabilizer bar and support arm; and
   said first locking element including an indent carried by one of said connector head and said connector receiver; and said second locking element including a nib carried by the other of said connector head and connector receiver projecting into said indent in interlocking engagement.

21. A vehicle mirror assembly for mounting an exterior rearview mirror to a vehicle body, the assembly having a support arm which is pivotally mounted to the vehicle for supporting the mirror, and a stabilizer bar having a first end pivotally mounted to the vehicle and a second end attached to the support arm, said assembly comprising:
   a connector head carried by one of said second end of said stabilizer bar and said support arm, and a connector receiver carried by the other of said stabilizer bar and support arm;
   said connector receiver including a retention slot for receiving said connector head;
   a first locking element carried by said connector head;
   a second locking element carried within said retention slot;
   an elongated convex biasing element carried longitudinally in said retention slot biasing said first and second locking elements together to provide a reliable interlocking connection between said stabilizer bar and support arm; and
   said biasing element including an elongated leaf spring having first and second ends, said leaf spring having a convex section between said first and second ends, said leaf spring being carried longitudinally in said retention slot so that said connector head engages and depresses said convex section when said connector head is engaged in said connector receiver.

* * * * *